June 3, 1924.

W. C. HUEBNER 1,496,638

EXPOSURE CONTROLLING MECHANISM FOR PHOTOGRAPHIC APPARATUS

Filed May 19, 1921  4 Sheets-Sheet 1

INVENTOR.
William C. Huebner
by Parker & Rockwood
ATTORNEYS.

Patented June 3, 1924.

1,496,638

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

EXPOSURE-CONTROLLING MECHANISM FOR PHOTOGRAPHIC APPARATUS.

Application filed May 19, 1921. Serial No. 470,782.

*To all whom it may concern:*

Be it known that I, WILLIAM C. HUEBNER, a citizen of the United States, residing at Buffalo, in the county of Erie and State of New York, have invented a new and useful Improvement in Exposure-Controlling Mechanism for Photographic Apparatus, of which the following is a specification.

This invention relates to mechanisms for use in connection, for example, with electric lamps used in photographic work or with photographic printing apparatus for the purpose of controlling, as required, the period of exposure to the light.

One object of the invention is to provide a practical and reliable mechanism of novel construction which will automatically vary the period of exposure in accordance with variations in the intensity of the electric light, due to fluctuations in the light current, in such a way as to give a definite ultimate amount of light for a given exposure. That is to say, the period of exposure is lengthened to compensate for a decrease in intensity of the light and is shortened with an increase in intensity of the light. Other objects of the invention are to provide a desirable mechanism of this kind which can be readily set to give different required exposures and will operate automatically to shut off the light at the end of the period of time necessary for the amount of light for which the mechanism is set; also to produce a mechanism adapted without resetting or adjusting the mechanism, to give any required number of repeat exposure periods, each giving the same definite amount of light; also to provide means for starting and repeating the exposures which is adapted to be automatically operated by the movement of a part on the photographic apparatus with which the mechanism is used; and also to improve mechanisms for the purpose stated in the other respects herein-after described and set forth in the claims.

The controlling mechanism preferably comprises an electric lamp, an electric motor arranged so that its speed varies with changes in the lamp current, a period controlling device which is driven by the motor, and a starting and repeating switch arranged to be actuated by the movement of a part of the photographic apparatus with which the mechanism is used. The period controlling device is adapted to be set in different predetermined initial positions depending upon the exposure required and which at the end of the exposure period causes the light to be extinguished. The controlling mechanism can be utilized, as explained, to operate a switch to control an electric lamp, or to actuate means of other suitable sort by which exposure to light can be controlled.

Briefly described, the exposure controlling mechanism herein described in detail as an embodiment of the invention, includes an electric lamp, an electric motor arranged so that its speed varies with fluctuations in the lamp circuit, a motor driven period controller which is adjustable and which may be set to different positions to cause the lamp to be lighted and then extinguished after exposure periods of different predetermined lengths, these periods varying more or less with variations of current in the light circuit. When repeat exposures are made, each requiring the same amount of light, the controller will operate to run first in one direction between a fixed stop and another stop which has been set or adjusted in accordance with the required amount of light, and then in a reverse direction between these two stops. The controller will continue these operations alternately in opposite directions as described, while the motor runs continuously in one direction, through the medium of a snap switch incorporated with the controller, the switch being disposed between two rotary wheels or carriers driven in opposite directions by said motor, said switch having a member which is adapted to be coupled with one or the other of said wheels and also having a part adapted to alternately engage said fixed and said adjustable stops on the controller, in such a manner that the snap switch will, when the roller engages one or the other of said stops, be quickly uncoupled from the wheel with which it is traveling and coupled to the other wheel which will carry it in the opposite direction. The snap switch has contact devices adapted to engage contact rings which are mounted on the wheels and are at all times in engagement with contact brushes in electrical connection with an intermittently operated starting and repeating switch. This starting and repeating switch is adapted to close and open first a circuit including the contact rings on one of the wheels and then another circuit including the contact rings on the other wheel. The starting and repeating switch is adapted to be intermittently rotated by a ratchet device which is preferably operated by the same part of the photographic apparatus, such as the lever, that is used to place the negative in contact with the sensitized plate and apply the pressure to the same.

The exposure controlling device is preferably constructed as shown in the drawings and includes a period controller A and a starting and repeating switch B. The period controller is preferably mounted on the switch-board $a$ of the photographic apparatus, but may be located at any other suitable point and is driven by means of an electric motor A′ preferably mounted at the rear of the switch-board $a$.

The motor shaft 1 is coupled to a shaft 2 journalled in a gear casing 3 on the back of the switch-board and operatively connected by a gear train 4 in the casing 3 to a shaft 5 extending through the support $a$ to the front thereof and having a bearing in an index or indicator plate C. The gear train 4 may be of any suitable sort adapted to provide the required reduction of speed between the motor shaft 1 and the shaft 5. Any other suitable drive mechanism for the shaft 5 could be used. A pair of wheels or carriers, preferably in the form of oppositely disposed, like bevel gears 10 and 11, are mounted in spaced relation on the shaft, the gear 10 being keyed to the shaft and the gear 11 being free to rotate independently of said shaft.

Interposed between said bevel gears 10 and 11 and in mesh therewith is a bevel pinion 12 mounted to rotate freely on a sleeve 13 in a bearing bracket 14, said bracket also supporting the index plate C by means of screws or otherwise. The bevel gears 10 and 11 are thus caused to rotate in opposite directions. Each of these bevel gears is preferably provided with a pair of concentric contact rings 21, 21$^a$ and 22, 22$^a$, respectively, said rings being suitably insulated by annular fiber rings 23, and being secured in place by insulated screws 24, or otherwise. The purpose of these contact rings will be later described.

For the purpose of making and breaking the lamp circuit, for predetermined periods, a snap switch or circuit-breaking device D is provided. This snap switch D is interposed between the bevel gears 10 and 11 and includes a supporting frame 25 provided with bearings 26, 26, surrounding the shaft 5. Said frame is held from endwise movement by the bevel gears 10 and 11, see Fig. 6, but is free to rotate on the shaft 5. As shown, the frame comprises bars 27 extending parallel to and on opposite sides of the shaft 5 and connecting the bearings 26 and having lateral extensions 28 from which, in the position of the parts shown in the drawings, extend upwardly a pair of pivot arms 29. The bars 27 are also provided with upwardly extending bearing lugs 30 having holes for the reception of a pivot pin 31 on which a switch arm E of the snap switch is preferably pivoted. The switch arm is provided at its opposite sides with teeth 32, 33 which are adapted to alternately mesh respectively with the bevel gears 10, 11, and when so in mesh the frame 25 and switch arm will be coupled to and travel with or be rotated by the bevel gear with which the switch arm is in mesh when the controller is in operation.

On the outer or upper ends of the arms 29 of the supporting frame 25 is pivotally mounted as by pivot studs 34, a reversing lever 35, preferably having side arms 36, a bottom connecting bar 37, and a cross head 38 in the ends of which the pivot studs 34 are secured. The reversing lever carries a trip roller 39 mounted on a forwardly extending stud 39$^a$. When the switch arm E is coupled to and rotating with one or the other of the gears 10, 11, the reversing lever 35 will also rotate with the switch.

The trip roller 39 of the reversing lever is adapted to travel between and alternately engage with a pair of stops or trip devices 40, 41, the stop 40 being fixed on the back of the index plate at the zero point and the stop 41 being adjustable to place it at any predetermined point around the index plate to intercept the roller 39 and trip the lever 35. The adjustable stop 41 is preferably arranged as follows:—

43 is an adjusting arm suitably pivoted at one end concentrically with the bevel gear 11 adjacent the rear face of the index plate C, and provided with a lateral extension 44 to which the stop 41 is secured. The inner edge 42 of this stop is oblique and is located so as to engage the roller 39 when the reversing lever rotates in one direction and force the roller inwardly toward the shaft 5 into the position shown in Figs. 2 and 6, thus swinging the lower end of the reversing lever 35 to the position shown in Fig. 6, with its side arms 36 against the lateral extensions 28 of the supporting frame 25 and adjacent the bevel gear wheel 10. When the reversing lever 35 rotates in the opposite direction the roller 39 will engage the outwardly directed oblique face 43 on the fixed stop 40 and be forced outwardly as indicated by the dotted arc 39$^b$ and dotted circle 39$^c$, Fig. 5. This will swing the lever 35 on its pivot to the other side of a dead center position with its side arms 36 against the lateral extensions 28 of the supporting frame adjacent the bevel gear wheel 11. This action of the reversing lever effects the movement of the snap switch arm E from the position in which it is coupled to the bevel gear 10 to a position to couple it to the other bevel gear 11. For this purpose, coil springs 44 under tension are attached to the lower cross bar of the reversing lever 35 and to side ears 45 at the upper end of the switch arm. As soon as the lower end of the reversing lever passes the dead center in its movement from one position to the other as explained, the switch arm E will be instantly swung on its pivot 31 by the springs 44 and be snapped into mesh with the bevel gear 11. In similar manner the switch arm is snapped over to the other bevel gear by an opposite movement of the reversing lever.

If desired, the outer end of the switch arm E may be provided with a handle or finger piece E', so that when the adjustable stop is moved to a different position the switch arm E may be moved from its position in mesh with the bevel gears to a position intermediate of the bevel gears 10, 11 and swung or rotated to the new position, thus permitting the roller 39 to engage the stop 42 without having to run the motor for a part of an exposure period and thus consume unnecessary time. Means are preferably provided for preventing the premature swinging of the switch arm E from one side to the other by the pull of the springs 44, which would result in shortening the intended exposure period. The means shown in the drawings for this purpose are constructed as follows:—

Figures 5, 6, 7, 8, 9, 10:
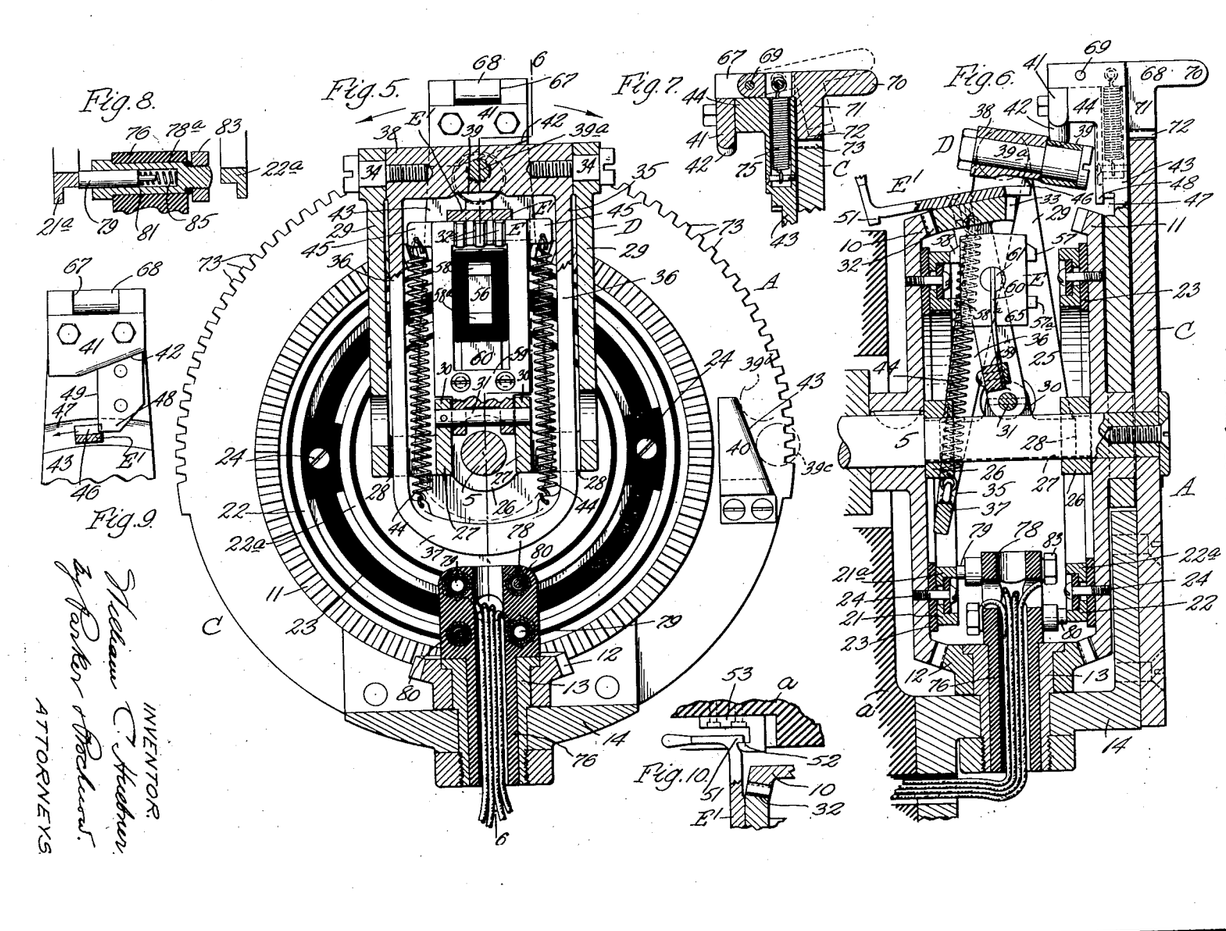
Fig. 5 is a transverse vertical section of the exposure controller on line 5—5, Fig. 2, on an enlarged scale, but with the reversing lever and snap switch thereof in an intermediate position, for the sake of clearness.
Fig. 6 is a longitudinal vertical section thereof on line 6—6, Fig. 5, with the parts in the same relative positions shown in Fig. 2.
Fig. 7 is a longitudinal sectional elevation of the adjustable stop for the exposure controller.
Fig. 8 is a similar view of one of the contact brushes of the exposure controller.
Fig. 9 is a fragmentary rear view of the adjustable stop for the exposure controller.
Fig. 10 is a fragmentary sectional plan view of a retaining device for the snap switch.

The finger piece E' is provided at its forward end with an outwardly directed shoulder or lug 46, and the arm 43, see Fig. 9, is provided with a recess 47 having an overhanging retaining lip 48. These parts are so positioned that when the snap switch E, as it travels with the bevel gear 11, approaches the lever 43, the lug 46 will enter the recess 47 and be retained by the lip 48. The lip, as shown, may be formed by a plate secured to the lever 43 and having an abrupt edge 49 arranged in a radial line with regard to the path of travel of the lug 46. The front of the plate C is provided with a scale 50 of any suitable sort which is preferably graduated in minutes and fractions thereof, or in any other way to represent the required period of exposure. The edge 49 before mentioned, is so located that when the lever 43 is moved to vary the exposure periods, the edge 49 will be in alinement with the graduation representing the required exposure. Consequently, when the lug 46 passes behind the lip 48, the snap switch cannot be actuated by the springs 44 until the lug clears the edge 49, when it will be actuated quickly and positively.

The movement of the snap switch at the opposite end of its travel or exposure period is similarly controlled by means of a shoulder 51 on the finger piece E' which engages a retaining finger 52 on a plate 53 fixed to the switch-board $a$, or otherwise, see Fig. 10, in register with the zero point of the scale 50 and the stop 40.

Figures 1, 3:
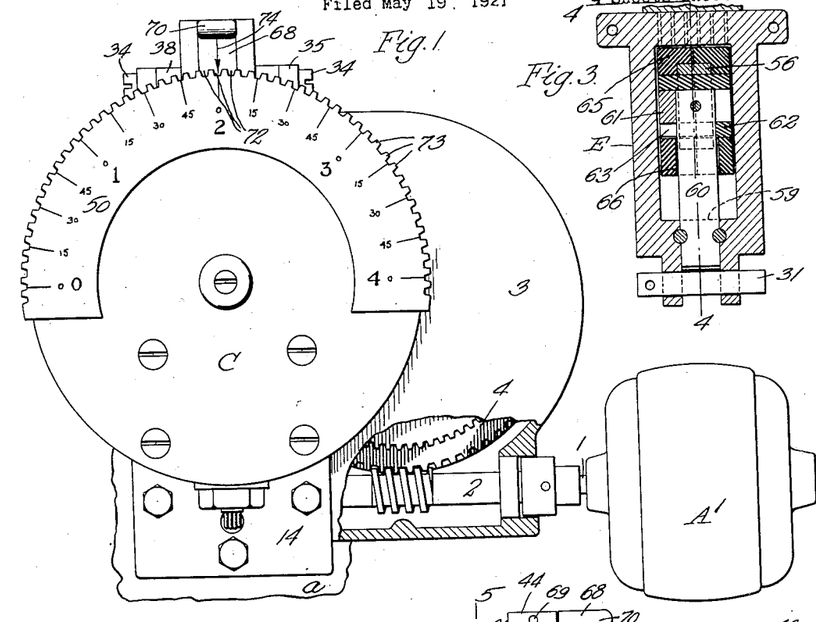
Fig. 1 is a front elevation of an exposure or period controlling mechanism embodying the invention.
Fig. 3 is a transverse sectional elevation, on an enlarged scale, of the snap switch and contact block of the exposure controller.

The switch arm E is preferably provided with a contact block 56 having a pair of contact lugs 57, 57$^a$ and 58, 58$^a$ on its front and rear faces respectively. The contact lugs 57, 57$^a$ are adapted to engage the contact rings 22, 22ᵃ in one position of the switch arm, and the contact lugs 58, 58ᵃ are adapted to engage the contact rings 21, 21ᵃ in the other position of the switch arm shown in Fig. 6. The contact block 56 is firmly held in contact with one or the other pair of contact rings 21, 21ᵃ and 22, 22ᵃ preferably as follows: The switch arm E is provided near its pivot 31 with a cross piece 59 having fixed thereto an outwardly extending stiff flat spring 60 to the outer end of which the contact block is secured. The outer end of the spring 60 is secured in a split pivot pin 61 which is surrounded by a fiber bushing 62 having a slot 63 in its lower side open at one end, see Fig. 4. The fiber bushing 62 is in turn surrounded by the contact block 56 which is slipped on endwise over the bushing and is also provided with an open-ended slot 64. The contact block is formed of suitable conducting material and is surrounded at the sides, top and bottom by a two-part insulating block 65 provided with a slot 66. The block 65 is formed of two like parts which are slipped on the opposite sides of the contact block and are held in place by the side pieces of the switch arm E, see Fig. 3. The spring 60 passes through the slots in the insulating block, contact block and insulating bushing. The described construction of these parts including the split pintle and fiber bushing and two-part insulating block enables the snap switch to be readily assembled or taken apart for repairs or replacement of parts.

Figures 2, 4:
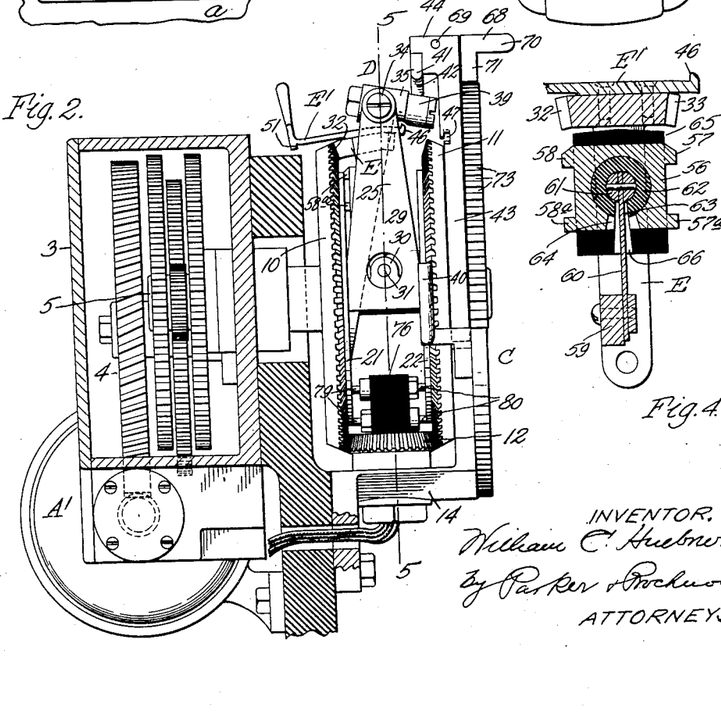
Fig. 2 is a side elevation thereof partly in section, on an enlarged scale.
Fig. 4 is a longitudinal sectional elevation thereof on line 4—4, Fig. 3.

Upon reference to Figs. 4 and 6 it will be seen that the slots in the fiber bushing 62, contact block 56 and fiber insulating block 65 permit a limited pivotal movement of the contact block on the pivot 61. When, therefore, the switch arm is swung from one position to the other on its pivot 31, the spring member 60 will be flexed, causing the contact block to assume a position with one or the other pair of its contact lugs in firm and intimate engagement with one or the other pair of contact rings 21, 21ᵃ or 22, 22ᵃ.

Any suitable latch or device can be employed for retaining the adjustable stop 41 in its different adjustments. As shown, the upper end of the arm 43 is recessed at 67 for the reception of a latch 68 pivoted in the recess on a pin 69. The latch has a forward extension or handle 70 and a downwardly extending leg 71 provided with teeth 72 which are adapted to mesh with teeth 73 milled in the periphery of the index plate C. The teeth 73 are proportioned, in the construction shown, to represent a five second period between each tooth and the latch is provided with a suitable pointer 74, see Fig. 1, cooperating with the scale 50 and which is in alinement with the edge 49 on the lever 43. Consequently the adjustable stop 41 of the lever 43 may be moved by means of the latch 68 to place the stop into any predetermined position according to the length of exposure required. The latch is held in place with its teeth 72 in mesh with the teeth 73 of the index plate, by a coil spring 75 secured in a hole in the end of the arm 43.

The electrical devices and connections whereby the proper circuits are formed to light and extinguish the lamp at the beginning and end of the travel of the snap switch, will now be described.

The pair of contact rings 21, 21ᵃ and the pair of contact rings 22, 22ᵃ constitute parts of two separate electrical circuits, either one of which, when closed by the starting and repeating switch B, will cause the lamp to be lighted, assuming all parts of the apparatus to be set for normal running. The contact block 56 in the operation of the controller will place one or the other of said circuits in condition, whereby when the starting and repeating switch is operated the circuit will be closed. For the purpose of making proper electrical connections at all times between the contact rings 21, 21ᵃ and 22, 22ᵃ and their respective circuits, the following means are preferably employed:

In the sleeve 13 an insulating bushing 76 is tightly fitted. The bushing 76 is provided with an enlarged head 78 having four transverse holes 78ᵃ therein adjacent its four corners. In two diagonally opposite holes are secured contact brushes 79 which extend rearwardly and one of which engages each of the contact rings 21 and 21ᵃ. The remaining two holes 78ᵃ are provided with similar brushes 80 extending forwardly in engagement with the contact rings 22, 22ᵃ. These contact brushes are held in plugs 81 of brass or other conducting material, see Fig. 8, each secured in the bushing 76 by a binding nut 83 which also secures one of the conductors of one of the aforementioned circuits to the plug. The brush is pressed outwardly and held yieldingly in engagement with its contact ring by means of a coil spring 85. By this construction each of the two pairs of contact rings may travel with its respective gear and be in continuous connection with its proper circuit.

The starting and repeating switch B is preferably constructed as follows:—

90 is a casing secured on any suitable support or part 90ᵃ of the photographic apparatus adjacent to the operating lever X of the latter. This casing comprises a back plate 91 and a cover 92. Secured to and extending forwardly from the support 90ᵃ is a stud 93 surrounded by a sleeve 94, the inner end of which is screwed into the back plate 91, the outer end being shaped to facilitate turning the sleeve to secure it in place. Surrounding the sleeve 94 between the back plate 91 and a shoulder 95 on the sleeve is a ratchet wheel 96 provided with teeth 97 at one end thereof and a hub 98 extending forwardly therefrom, see Fig. 14. This hub 98 is adapted to receive an insulating annular disk 99 provided with a pair of transverse contact bars 100 of suitable conducting material which extend parallel to each other in slots in one side of the disk on opposite sides of its center and are electrically connected by a wire or jumper 101. The contact bars 100 are adapted in certain positions of the disk, to engage a pair of spring contact fingers or members 102, 103, which are electrically connected by suitable conductors to the brushes 79 for the contact rings 21, 21$^a$ of the exposure controller. Another insulating disk 106 separated from the disk 99 by an insulating ring 107 is provided, with similar contact bars 108, connected by a jumper 109. These bars 108, when the disks are turned to other positions engage a second pair of spring contact fingers 110, 111 similarly electrically connected with the brushes 80 for the contact rings 22, 22$^a$ of the exposure controller. The contact fingers 102, 103, 110, 111 are mounted in any suitable way, preferably by means of binding screws 110$^a$ which clamp the fingers to a fixed insulating block 110$^b$ in the casing 90. These binding screws also secure the electrical conductors 104, 105, 147, to their respective spring fingers.

The fiber rings 99 and 106 are relatively disposed so that when the bars 100 are in contact with the contact fingers 102, 103, the bars 108 will be out of contact with the contact fingers 110, 111 and vice versa. The disks 99 and 106 are held in this relation to each other and secured to the ratchet 96 by screws 114, said disks and ratchet being in turn held in place by the sleeve 94. These parts constitute the circuit closing element of the starting and repeating switch. The various parts of the circuit closing element just described may be firmly held in their assembled relation by a hand locking nut 94$^a$ on the threaded outer end of the stud 93.

The ratchet 96 is provided in the construction shown with eight teeth so disposed that the circuit closing element will be given successive movements of one-eighth of a revolution for placing the bars 100 and 108 in contact with their respective contact fingers when the ratchet is actuated. For turning the ratchet as above mentioned an actuating lever 115 is pivoted on the hub of the ratchet, and is adapted to oscillate in a slot 116 in the casing 90. It is held in its normal position, shown in Figs. 11 and 13, in engagement with the upper end of the slot 116, by a coil spring 117. The lever carries a spring pressed pawl 118 for turning the ratchet, and a spring pressed dog 119 on the base plate 91 prevents the ratchet from reversing when the lever 115 is returned by its spring 117. As before mentioned, the starting and repeating switch is preferably arranged adjacent to the operating lever X of the photographic apparatus and this lever, during the last portion of its movement in the direction of the arrow, Fig. 11, engages a stud 120 at the end of the ratchet lever 115 and moves the ratchet lever to the other end of the slot 116, the lever X at the same time abutting against a fixed stop 121 on the rear of the back plate 91, where it is retained by suitable means (not shown) while an exposure is made. The lever X can be any lever or part which is actuated either by hand or automatically when the photographic apparatus is in condition ready to turn on the light to make an exposure.

Figure 11:
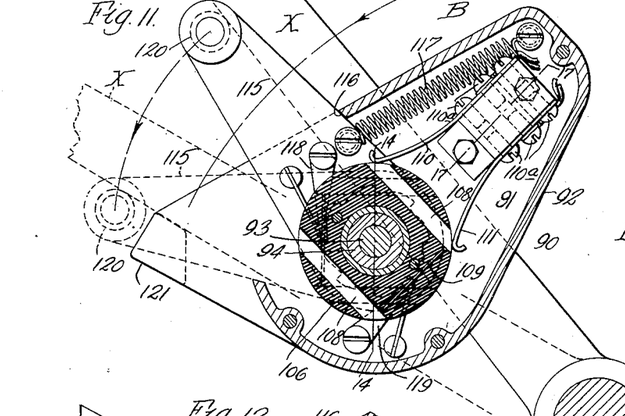
Fig. 11 is a transverse sectional elevation of the starting and repeating switch for the period controlling mechanism, shown adjacent to the operating lever of a photo-composing machine.
Figure 15:
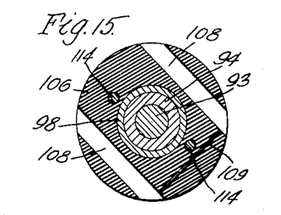
Figs. 15 and 16 are transverse vertical sections of the circuit closing element of the starting and repeating switch on lines 15—15 and 16—16, respectively, Fig. 14.
Figure 16:
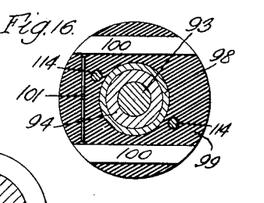

In the position of the parts of the controller A shown in Figs. 2 and 6 and of the starting switch B shown in Figs. 11, 15 and 16, one of the contact bars 108 has its ends in engagement with the contact springs 110, 111 of the circuit for the contact rings 22, 22$^a$ while the contact bars 100 of the circuit closing elements are out of engagement with the spring fingers 102, 103, see Figs. 11 and 15, but the lamp will not be lighted because at this time the snap switch E and contact block 56 are in engagement with the bevel gear 10 and contact rings 21, 21$^a$ of the other circuit.

Figures 12, 13, 14, 17, 18:
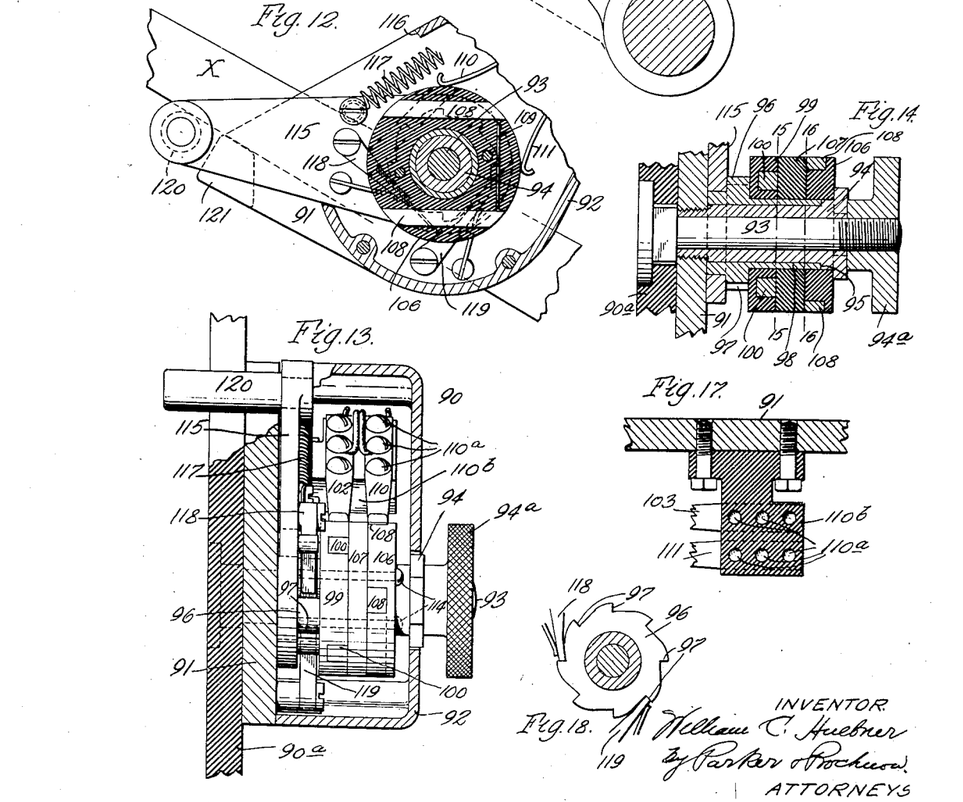
Fig. 12 is a similar figure with the parts in a different position.
Fig. 13 is a side elevation thereof partly in section, with the parts in the same relative positions shown in Fig. 12.
Fig. 14 is a longitudinal vertical section thereof on line 14—14, Fig. 11.
Fig. 17 is a sectional view on line 17—17, Fig. 11 of the insulated support for the contact fingers of the starting and repeating switch.
Fig. 18 is a view of the ratchet device for the starting and repeating switch.

Upon the actuation of the lever X, however, as explained, the ratchet lever 115 will turn the ratchet one-eighth of a revolution and move the contact bar 108 out of engagement with the fingers 110, 111 and place the ends of the bars 100 into engagement with the fingers 102, 103, see Fig. 12. This operation closes the circuit through the contact rings 21, 21$^a$ and the arc lamp will now be lighted and will remain lighted until the roller 39 engages the stop 40, when the reversing lever will be tripped and open the circuit of the contact rings 21, 21$^a$ by throwing the contact block 56 out of contact with said rings and into contact with the rings 22, 22$^a$. The return or reverse motion of the lever X will permit the ratchet lever to be drawn back by its spring to place the pawl 118 in position to again actuate the ratchet. Upon again actuating the lever X and ratchet the contact bars 100 will be moved out of engagement with the fingers 102, 103 and the contact bars 108 will then be in position to close the circuit through the fingers 110, 111. Thus the reversing switch, when actuated, will alternately close one circuit to the lamp and then open said circuit and close the other, the contact block meanwhile being so positioned by means of the reversing switch as to allow the desired circuit to be broken and contact made through the contact rings for the other circuit.

Figure 19:
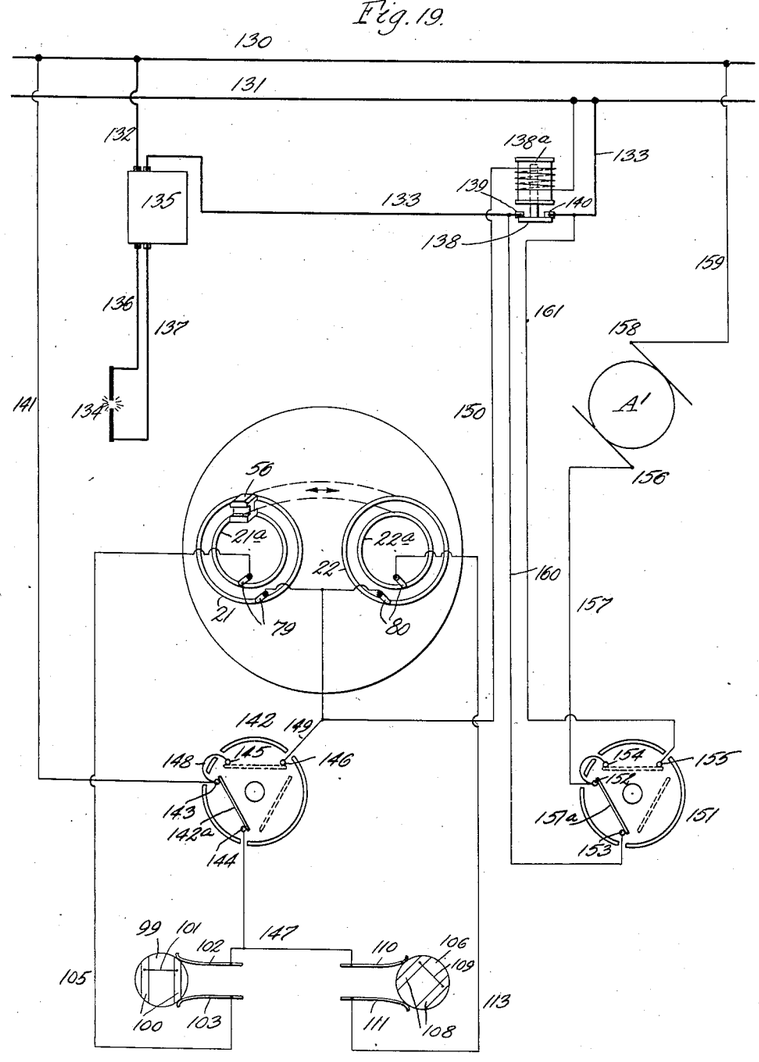
Fig. 19 is a diagram of the electrical wiring for the exposure controlling mechanism.

The electrical circuits of the apparatus are preferably arranged as shown in Fig. 19, in which 130, 131 are the main line feed wires from which current is taken to the lamp 134 through conductors 132, 133, a rheostat 135 and supplementary conductors 136, 137. The current to the lamp 134 is preferably controlled by means of a main switch 138 actuated by a solenoid 138ª and adapted to connect a pair of contacts 139, 140 arranged in the conductor 133, so that when the solenoid is energized and connects the contacts 139, 140, the lamp will be lighted, but will be extinguished when the current is not passing through the solenoid.

The circuits including the contact rings 21, 21ª and 22, 22ª are as follows:

142 is a three-way switch suitably mounted adjacent the exposure controller and having a contact piece 142ª which is adapted to engage either of two pairs of contacts 143, 144 and 145, 146 or to be placed in a third position in which it will be out of engagement with all of said contacts. A conductor 141 connects the contact 143 to the main feed wire 130, and the contact 144 is connected by a branched conductor 147 to one of the fingers 102 of the circuit for the contact rings 21, 21ª and to one of fingers 110 of the circuit for the contact rings 22, 22ª. A conductor 148 connects the contact 145 to the contact 143 and a branched conductor 149 connects the contact 146 to one brush 79 and one brush 80 of the contact ring circuits, and a branch 150 connects the conductor 149 to the winding of the solenoid 138ª and through it to the main feed wire 131.

The connections for the motor A' are as follows:—

151 is another three-way switch, having a contact piece 151ª which is adapted to connect either of two pairs of contacts 152, 153 and 154, 155, the contacts 152, 154 being connected to each other and to one terminal 156 of the motor by means of a conductor 157. The other motor terminal 158 is connected by a conductor 159 to the main feed wire 130. The other two contacts 153, 155 of the three-way switch 151 are connected by conductors 160, 161, respectively to the conductor 138 of the lamp circuit at opposite sides of the main switch 138.

For the operation of the exposure controller A and starting and repeating switch B, as explained, the three-way switches 142 and 151 are set as shown in Fig. 19, with the contact piece 142ª in engagement with the contacts 143, 144 and the contact piece 151ª in engagement with the contacts 152, 153. In this position the motor is connected in the lamp circuit by way of conductor 160, and when the main switch is operated by the solenoid 138ª to close the lamp circuit, as presently explained, the motor will start and drive the bevel gears 10 and 11 in opposite directions carrying with them their respective pairs of contact rings 21, 21ª and 22, 22ª.

Assuming the operating lever X and the ratchet lever 115 to have been moved to the position shown in Fig. 12 and the stop 41 and roller 39 having been set for example for a two minute exposure as shown in Figs. 1 to 6, the lamp will be lighted from the line 130 through the conductor 141, contact 143, contact piece 142ª, contact 144, conductor 147, spring finger 102, the contact bar 100, spring finger 103, conductor 105, the inner brush 79, contact ring 21ª, contact block 56, outer contact ring 21, brush 79, conductors 149 and 150, through the solenoid 138ª to the line 131. The solenoid being thus energized will close the contacts 139 and 140 in the lamp conductor 133 thereby lighting the lamp and starting the motor. The roller 39, reversing lever 35 and contact block 56 will now be moving towards the fixed stop 40, the roller 39 striking and being moved to trip the reversing lever 35 by said stop 40, after an interval of two minutes.

This interval of two minutes may vary from clock time more or less, as the motor A' is of that sort which varies in its rated speed in accordance with the fluctuations in the current. That is to say, if the voltage drops below normal the motor will slow down somewhat and consequently the speed of the gears 10 and 11 and will be reduced and the roller 39 will take a longer interval of time in traveling between the stops 41, 42. As is well known, when the voltage drops as stated above, the length of the arc and consequently the strength of the light is reduced. Likewise, if the voltage is increased and the arc is lengthened beyond normal the speed of the motor is increased and will carry the roller 39 from one stop to the other in less time. By the described arrangement, therefore, the ultimate, required amount or quantity of light will be given for all exposures.

When the roller 39 reaches the stop 40 the contact block 56 will be snapped out of contact with the rings 21, 21ª thus breaking the circuit above described and the arc lamp will be extinguished and the motor stopped. The lever X is now returned to the position shown in Fig. 11 for operating or adjusting the photographic apparatus for making another print, and the ratchet lever 115 will be returned by its spring 117 to its initial position ready for rotating the ratchet another tooth space.

The next movement of the lever X to the position shown in Fig. 12 will cause the ratchet lever 115 to rotate the ratchet and disks 99, 106 one step, thus moving the contact bars 100 out of engagement with their spring fingers 102, 103 and placing one of the contact bars 108 into engagement with the spring fingers 110, 111. The lamp will now be lighted through conductor 141, contact 143, contact piece 142ª and contact 144, conductor 147, spring finger 110, contact bar 108, spring finger 111, conductor 113, inner brush 80, contact ring 22ª, contact block 56, outer contact ring 22, outer brush 80, conductors 149 and 150 and through the solenoid 138ª, closing the line 133 and lighting the lamp as before. The lamp will now remain lighted during the return or opposite travel of the snap switch until the roller 39 engages the adjustable stop 41 and again actuates the snap switch to extinguish the lamp and stop the motor. The period controller thus operates to control the exposure period in the same manner whether traveling in one direction or the other, giving successive like exposures in its alternate opposite movements. In repeating like exposures, it is not necessary to reset or return the period controlling device by hand after each exposure but the controller operates automatically upon the actuation of the lever or part X of the photographic apparatus.

If it is desired to use the lamp for an indefinite period, to adjust the carbons or for other reasons, the motor switch 151 is set to its "off" position, and the contact piece 142ª of the lamp switch 142 is moved into engagement with the contacts 145, 146. As there will now be no electrical connection between the contact rings 21, 21ª, 22, 22ª, and the reversing switch, the current will flow from main line wire 130 through conductor 141, contact 143, conductor 148 and contact 145, contact piece 142ª, contact 146, conductors 149 and 150 to solenoid 138ª and to the other line wire 131. The solenoid being energized it will close the line 133 and the lamp will burn as long as required.

It may at times be necessary to run the motor A' to test the operation of and make adjustments or changes in the exposure controller A, while allowing the lamp to remain extinguished to avoid a partial exposure, or fogging of the sensitized plate. For this purpose the lamp switch 142 is set to its "off" position and the motor switch 151 turned to place its contact piece 151ª in engagement with the contacts 154, 155. Current will now flow from main line wire 131 through the conductors 133 and 161, contact 155, contact piece 151ª and contact 154, conductor 157, motor terminals 156, 158 and conductor 159 to the other main line wire 130, thus allowing the motor to drive the bevel gears 10, 11 without having the contact rings in electrical connection with the lamp.

I claim as my invention:

1. In an exposure controlling mechanism, the combination of two driving members, means for driving said members in opposite directions, a controlling device adapted to be coupled to said driving members alternately for moving said controlling device alternately in opposite directions, means for uncoupling said controlling device from one of said driving members and coupling it to the other driving member when said controlling device has traveled a predetermined distance in either direction, means for supplying light during the travel of said controlling device in either direction, and means controlled by said device for cutting off said light when said controlling device has traveled said predetermined distance in either direction.

2. In an exposure controlling mechanism, the combination of a controlling device, means for moving said controlling device alternately in opposite directions, means for supplying light during the travel of said controlling device in each direction, means controlled by said device for cutting off said light when said controlling device has traveled a predetermined distance in each direction, and means for varying at will said predetermined distance of travel.

3. In an exposure controlling mechanism, the combination of a controlling device, means for moving said controlling device alternately in opposite directions, means for supplying light during the travel of said controlling device in each direction, means controlled by said device for cutting off said light when said controlling device has traveled a predetermined distance in each direction, means for arresting said controlling device when it has traveled said predetermined distance in either direction, and means for starting said controlling device.

4. In an exposure controlling mechanism, the combination of a controlling device, means for moving said controlling device alternately in opposite directions, means cooperating with said controlling device for supplying light during the travel of said controlling device in each direction and cutting off said light when said controlling device has traveled a predetermined distance in either direction, and means for arresting said controlling device at the end of its predetermined travel in either direction.

5. The combination of an electric lamp, an electric motor whose speed varies with variations in the light of said lamp, a controlling device, means driven by said motor for moving said controlling device alternately in opposite directions, means cooperating with said controlling device for maintaining said lamp lighted during the travel of said controlling device and extinguishing the light when the controlling device has traveled a predetermined distance in either direction, and means for stopping said motor and arresting said controlling device when it has traveled said predetermined distance in either direction.

6. The combination of an electric lamp, an electric motor whose speed varies with variations in the light of said lamp, a controlling device, means driven by said motor for moving said controlling device alternately in opposite directions, means cooperating with said controlling device for maintaining said lamp lighted during the travel of said controlling device and extinguishing the light when the controlling device has traveled a predetermined distance in either direction, means for stopping said motor and arresting said controlling device when it has traveled said predetermined distance in either direction, and means for starting said motor and lighting said lamp at will.

7. In an exposure controlling mechanism, the combination of a controlling device, means for moving said controlling device alternately in opposite directions, means cooperating with said controlling device for supplying light during the travel of said controlling device in each direction and cutting off said light when said controlling device has traveled a predetermined distance in either direction, and means for arresting said controlling device at the end of its predetermined travel in either direction, said controlling mechanism being adjustable for varying the predetermined travel of said controlling device.

8. The combination of an electric lamp, an electric motor whose speed varies with variations in the light of said lamp, a controlling device, means driven by said motor for moving said controlling device alternately in opposite directions, a contact device, a lamp controlling circuit including a set of contacts which are connected by said contact device when said controlling device travels in one direction, and a different set of contacts which are connected by said contact device when said controlling device travels in the opposite direction, means for shifting said contact device from one to the other of said sets of contacts when the controlling device has traveled a predetermined distance in either direction, for extinguishing the light and stopping said motor, and means for completing said circuit through said contact device and one set of contacts for lighting the lamp and starting the motor.

9. The combination of an electric lamp, an electric motor, a controlling device, means driven by said motor for moving said controlling device alternately in opposite directions, a lamp controlling circuit including a contact device, means for actuating said contact device to extinguish the light of said lamp and stop said motor when said controlling device has traveled a predetermined distance in either direction, and means for completing said circuit through said contact device for lighting said lamp and starting said motor and controlling device.

10. The combination of an electric lamp, an electric motor whose speed varies with variations in the light of said lamp, a controlling device, means driven by said motor for producing successive predetermined movements of said controlling device, a lamp controlling circuit including a contact device, means for actuating said contact device to extinguish the light of said lamp and stop said motor at the end of each of the movements of said controlling device, and means for completing said circuit through said contact device for lighting said lamp and starting said motor and controlling device.

11. The combination of an electric lamp, an electric motor whose speed varies with variations in the light of said lamp, a controlling device, means driven by said motor for producing successive predetermined movements of said controlling device, a lamp controlling circuit including a circuit breaker and a starting switch, means for actuating said circuit breaker to extinguish the light of said lamp and stop said motor at the end of each of said movements of said controlling device and then placing said circuit in condition to be again closed by said starting switch, said starting switch when actuated completing said circuit and again lighting the lamp and starting the motor and controlling device.

12. The combination of an electric lamp, an electric motor whose speed varies with variations in the light of said lamp, a controlling device, means driven by said motor for producing successive predetermined movements of said controlling device, a lamp controlling circuit including a circuit breaker and a starting switch, means for actuating said circuit breaker to extinguish the light of said lamp and stop said motor at the end of each of said movements of said controlling device and then placing said circuit in condition to be again closed by said starting switch, said starting switch when actuated completing said circuit and again lighting the lamp and starting the motor and controlling device, and said actuating means for said circuit breaker being adjustable for regulating the length of the predetermined movements of said controlling device.

13. The combination of an electric lamp, an electric motor whose speed varies with variations in the light of said lamp, two driving members driven in opposite directions by said motor, a controlling device adapted to be coupled to said driving members alternately for moving said controlling device alternately in opposite directions, means for uncoupling said controlling device from one of said driving members and coupling it to the other driving member when said controlling device has traveled a predetermined distance in either direction, a contact device which travels with said controlling device, a lamp controlling circuit including a set of contacts which are connected by said contact device when said controlling device travels in one direction and a different set of contacts which are connected by said contact device when said controlling device travels in the opposite direction, said contact device being shifted from one to the other of said sets of contacts for extinguishing the light and stopping said motor when said controlling device is uncoupled from one of said driving members, and means for completing said circuit through said contact device and said other set of contacts for again lighting the lamp and starting the motor.

14. The combination of an electric lamp, two rotatable wheels, means for rotating said wheels in opposite directions, a controlling device adapted to be coupled to said wheels alternately for moving said controlling device alternately in opposite directions, means for uncoupling said controlling device from one of said wheels and coupling it to the other wheel when said controlling device has traveled a predetermined distance in one direction, a contact device, a lamp controlling circuit including a pair of contact rings which are connected by said contact device when said controlling device travels in one direction and a second pair of contact rings which are connected by said contact device when said controlling device travels in the opposite direction, said contact device being shifted from one to the other of said pairs of contact rings for extinguishing the light and stopping said wheels when the controlling device is uncoupled from one of said wheels, and means for completing said circuit through said contact device and said other pair of contact rings for again lighting the lamp and starting the wheels.

15. The combination of an electric lamp, two rotatable wheels, means for rotating said wheels in opposite directions at a rate of speed which varies with variations in the light of said lamp, a controlling device adapted to be coupled to said wheels alternately for moving said controlling device alternately in opposite directions, means for uncoupling said controlling device from one of said wheels and coupling it to the other wheel when said controlling device has traveled a predetermined distance in one direction, a contact device, a lamp controlling circuit including a pair of contact rings which are connected by said contact device when said controlling device travels in one direction and a second pair of contact rings which are connected by said contact device when said controlling device travels in the opposite direction, said contact device being shifted from one to the other of said pairs of contact rings for extinguishing the light and stopping said wheels when the controlling device is uncoupled from one of said wheels, and means for completing said circuit through said contact device and said other pair of contact rings for again lighting the lamp and starting the wheels, and said uncoupling means for said controlling device being adjustable for regulating the predetermined travel of said controlling device.

WILLIAM C. HUEBNER.